United States Patent [19]

Underwood, Jr.

[11] Patent Number: 5,443,344

[45] Date of Patent: Aug. 22, 1995

[54] METHOD AND APPARATUS FOR ATTACHING TWO MEMBERS TOGETHER FROM ONE SIDE THEREOF

[75] Inventor: Ted T. Underwood, Jr., Ames, Iowa

[73] Assignee: Iowa State University Research Foundation, Inc., Ames, Iowa

[21] Appl. No.: 304,408

[22] Filed: Sep. 12, 1994

[51] Int. Cl.⁶ .................... F16B 13/04; F16B 13/06
[52] U.S. Cl. ................................. 411/43; 411/60; 411/69; 248/231.2
[58] Field of Search ............... 411/40, 41, 42, 43, 411/69, 70, 60; 248/231.2, 231.9; 29/525.1

[56] References Cited

U.S. PATENT DOCUMENTS

| | | | |
|---|---|---|---|
| 4,003,288 | 1/1977 | Jeal | 411/70 |
| 4,388,031 | 6/1983 | Rodgers | 411/43 |
| 4,708,552 | 11/1987 | Bustos et al. | 411/42 X |

FOREIGN PATENT DOCUMENTS

| | | | |
|---|---|---|---|
| 1228781 | 4/1971 | United Kingdom | 411/70 |
| 2093550 | 9/1982 | United Kingdom | 411/43 |

*Primary Examiner*—Neill R. Wilson
*Attorney, Agent, or Firm*—Henderson & Sturm

[57] ABSTRACT

A method and apparatus for attaching two members together which includes forming an opening through a first member. A second member has a first portion thereof which is larger than the opening in the first member and a second portion disposed about a longitudinal axis. The second portion is smaller than the opening in the first member and the second portion is divided along the longitudinal axis into at least two sections. A hole is formed through the second member along the longitudinal axis. An elongated member having an enlarged head thereon is placed through a washer, the enlarged portion of the elongated member being larger than the opening in the washer, but smaller than the hole through the second member. The elongated member is placed first through the opening in the washer, then through the hole in the second member from the second portion side to the first portion side of the second member whereby the enlarged portion of the elongated member engages the washer and the washer engages the second portion of the second member. Then the second member is placed in a position wherein the first portion thereof is disposed on one side of the first member and the second portion of the second member extends through the opening unit disposed on the other side of the first member. The elongated member is then pulled from the first portion side of the second member until the washer bends the sections of the second portion apart to the point that the second portion cannot be withdrawn from the opening in the first member, and further pulling the elongated member until the enlarged portion thereof is forced through the opening in the washer whereupon further pulling of the elongated member is accomplished until it has pulled completely through the hole in the second member whereby the second member will be secured through the first member and the elongated member will be discarded.

5 Claims, 1 Drawing Sheet

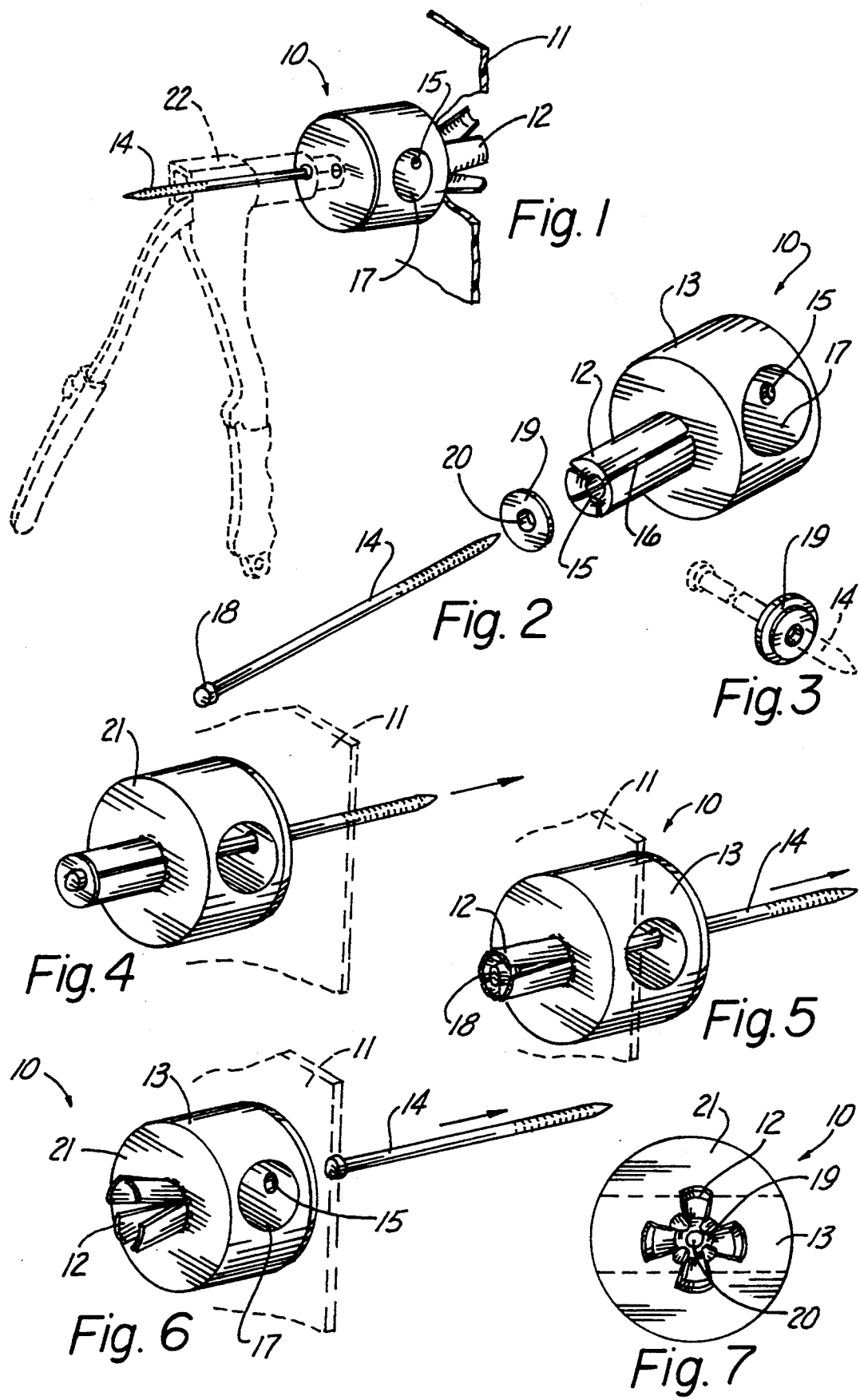

METHOD AND APPARATUS FOR ATTACHING TWO MEMBERS TOGETHER FROM ONE SIDE THEREOF

TECHNICAL FIELD

The present invention relates to a method and apparatus for attaching two members together from one side of the members and more particularly to such a device which utilizes a pop rivet gun to implement the process.

BACKGROUND ART

There are many situations in which it is desired to attach a member to another member where access is not possible from the other side of such members. Examples would be for attaching things to walls or to structural metal for steel studs which provide the support for walls of buildings. Another problem is how to attach cables to the back of computers to hold them in place without opening up the computer which would, in most instances, void the warranty thereof.

DISCLOSURE OF THE INVENTION

The present invention relates to a method and apparatus for attaching two members together which includes forming an opening through a first member. A second member has a first portion thereof which is larger than the opening in the first member and a second portion disposed about a longitudinal axis, the second portion being smaller than the opening in the first member and the second portion being divided along the longitudinal axis into at least two sections. A hole is formed through the second member along the longitudinal axis. An elongated member having an enlarged head thereon is placed through a washer, the enlarged portion of the elongated member being larger than the opening in the washer, but smaller than the hole through the second member.

The elongated member is placed first through the opening in the washer, then through the hole in the second member from the second portion side to the first portion side of the second member whereby the enlarged portion of the elongated member engages the washer and the washer engages the second portion of the second member Then the second member is placed in a position wherein the first portion thereof is disposed on one side of the first member and the second portion of the second member extends through the opening unit disposed on the other side of the first member. The elongated member is then pulled from the first portion side of the second member until the washer bends the sections of the second portion apart to the point that the second portion cannot be withdrawn from the opening in the first member, and further pulling the elongated member until the enlarged portion thereof is forced through the opening in the washer whereupon further pulling of the elongated member is accomplished until it has pulled completely through the hole in the second member, whereby the second member will be secured through the first member and the elongated member will be discarded.

An object of the present invention is to provide an improved method and apparatus for attaching two members together.

Another object of the present invention is to provide such a method and apparatus which can tie accomplished from one side of the two members without having access to the ether side thereof.

Other objects, advantages, and novel features of the present invention will become apparent front the following detailed description of the invention when considered in conjunction with the accompanying drawings.

BRIEF DESCRIPTION OF THE DRAWINGS

FIG. 1 is a perspective view of the apparatus of the present invention shown utilizing a pop rivet gun to attach two members together;

FIG. 2 is a perspective exploded view showing one of the members along with associated structure used for making the connection between the two members;

FIG. 3 is a perspective view of a washer constructed in accordance with the present invention and having a finishing nail or the like shown in dashed lines extending therethrough;

FIG. 4 is a perspective view of the structure shown in FIG. 2 just prior to the time that the member shown in solid lines is attached to the member shown in dashed lines;

FIG. 5 is a view like FIG. 4 but showing the finishing nail being pulled partially through one of the members to separate sections used to fasten members together;

FIG. 6 is a further sequential view from FIGS. 4 and 5 which show the completed connection whereby the finishing nail has been pulled completely through the members causing a washer to spread sections of one of the members to secure the two members together; and FIG. 7 is a plan view of one end of the fastening apparatus showing how the washer has flared the ;sections of the fastener apart.

BEST MODE FOR CARRYING OUT THE INVENTION

Referring now to the drawings wherein like reference numerals designated identical or corresponding parts throughout the several views, FIG. 1 shows a member (10) for connection to a end member (11), which member (11) can for example be the back wall of a computer. The back wall of the computer (11) has an opening therein approximately, but slightly larger than, the diameter of a portion (12) of the member (10). An enlarged portion (13) of the member (10) has a longitudinal axis coincident with the longitudinal axis of the elongated member or finishing nail (14) shown in the drawings and this hole (15) through member (10) extends through both sections (12) and (13) of member (10). The portion (12) has been cut into four sections along seams (16). Essentially two straight cuts completely across and at ninety degrees to each other have been cut through the section (12) to permit the, smaller portion (12) of the member (10) to be deformable as shown in FIGS. 1, 5, 6 and 7. A large opening (17) in enlarged portion (13 ) of member (10) is provided for allowing the electrical or other computer cables to extend therethrough, it being understood that it can be used to hold other types of wires or the like.

The finishing nail (14) has an enlarged end (18) thereon which contacts the washer (19) when the nail (14) extends through opening (20) in the washer (19) and through opening (15) in member (10).

In operation, the finishing nail (14) is first placed through the washer (19) as is shown in FIG. 3. then the nail and washer are placed in the position as shown in FIG. 4 and the smaller end (12) of the member (10) is placed through the hole in member (11) from the enlarged end side (13) of the member (10), for example, in the position shown in FIG. 1. FIGS. 4, 5 and 6 show a view from the inside of the computer housing wherein the member (11) is in abutment with the surface (21) of enlarged portion (13) of member (10). The installer, on the other hand, does not normally have access to this side of the member (11), although this device could be used where access is possible just because this is a very convenient fastener for fastening almost any two members together.

Once the two members (10) and (11) are in the position shown in FIG. 4, then a pop rivet gun (22) or the like, such as that shown in FIG. 1 in dashed lines, is used to grasp the pointed end of finishing nail (14) and pull it in the direction of the arrows shown in FIGS. 4, 5 and 6. The pop rivet gun can continue to be used to take a new bite on the nail (14) and continue to pull it from the position shown in FIG. 4 to the position shown in FIG. 5, wherein the sections of portion (12) begin to spread apart because the washer (19) is being forced inside of the sections of portion (12). The finishing nail (14) is pulled even further until the enlarged end (18) forces its way through the opening (20) in washer (19), whereupon the nail can be freely withdrawn from the hole (15) and be discarded or reused.

The member (10) in its preferred embodiment is constructed of an aluminum material which allows bending of the sections (12) without breaking them. Furthermore, the finishing nail (14) is constructed of iron or steel and the washer (19) constructed of aluminum or the like which is softer than the material that the nail (14) is constructed of, whereby the enlarged head (18) can deform the washer (19) and pull through the opening (20) as well as being deformed into the condition shown in FIG. 7, wherein it will be firmly wedged between the sections of portion (12) when the connection is complete. The washer must be made of a material more deformable than that of nail (14) such as of aluminum or another thin sheet of metal.

Accordingly it will be appreciated that the preferred embodiment shown herein does indeed accomplish the aforementioned objects. Obviously many modifications and variations of the present invention are possible in light of the above teachings. It is therefore to be understood that, within the scope of the appended claims, the invention may be practiced otherwise than as specifically described.

I claim:

1. A method of attaching two members together comprising:
    a. forming an opening through a first member;
    b. forming a second member to have a first portion thereof which is larger than the opening in said first member and a second portion disposed about a longitudinal axis and which is smaller than said opening, said second portion being divided along said longitudinal axis into at least two sections;
    c. forming a hole through said second member along said longitudinal axis;
    d. placing an elongated member which is smaller than said hole through a washer having an opening therein, said elongated member having an enlarged portion thereon which is larger than the opening in said washer but smaller than the hole through said second member;
    e. placing said elongated member first through the opening in said washer and then through the hole in said second member from the second portion side to the first portion side of said second member whereby the enlarged portion of said elongated member engages said washer and said washer engages said second portion of said second member;
    f. placing said second member in a position wherein said first portion thereof is disposed on one side of said first member and the second portion of the second member extends through said opening and is disposed on the other side of said first member; and
    g. pulling on said elongated member from the first portion side of said second member until the washer bends the sections of said second portion apart to the point that the second portion cannot be withdrawn from said opening in the first member, and further pulling said elongated member until said enlarged portion thereof is forced through said opening in the washer, and further pulling said elongated member until the elongated member has been pulled completely through the hole in said second member, whereby said second member will be secured to said first member.

2. An apparatus for attaching things together comprising:
    a first member having an opening therein;
    a second member having a first portion thereof which is larger than said opening and a second portion disposed about a longitudinal axis and which second portion is smaller than and disposed through the opening in the first member said second portion being divided along said longitudinal axis into at least two sections;
    a hole disposed through said second member along said longitudinal axis;
    a washer having a hole therethrough;
    an elongated member which is smaller in diameter than the hole in said washer and smaller than the hole in said second member, said elongated member having an enlarged portion thereon which is larger than the hole in the washer and larger than the hole in said second members, said elongated member being disposed through the hole in the washer and through the hole in said second member, said washer being disposed between said enlarged portion of the elongated member and one end of the second portion of the second member whereby pulling on said elongated member from the first portion side thereof will cause the washer to spread and hold said sections of the second portion apart thereby attaching said second member to said first portion.

3. The apparatus of claim 2 wherein said washer is deformable whereby the elongated member can be pulled through the washer and thereby through the hole in the second member.

4. The apparatus of claim 3 including means on said first portion of the second member for receiving an electrical cable therethrough.

5. The apparatus of claim 4 wherein said first member is a portion of a computer housing.

* * * * *